June 3, 1952  J. P. HOOKS  2,599,259
LICENSE PLATE HOLDER
Filed July 17, 1950
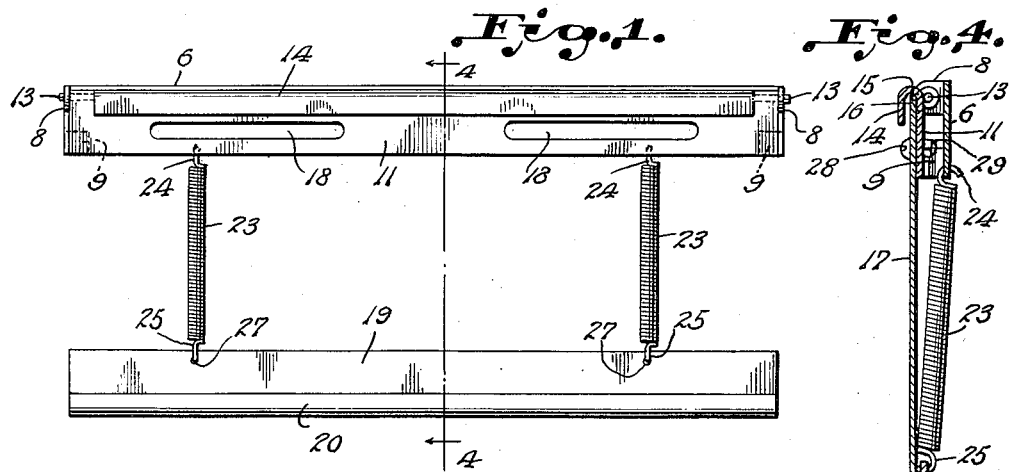
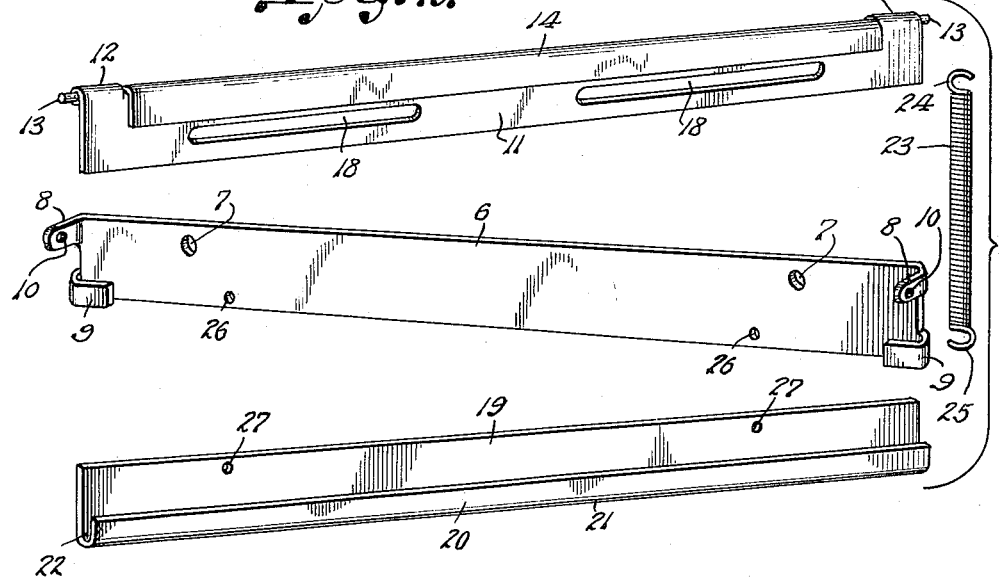
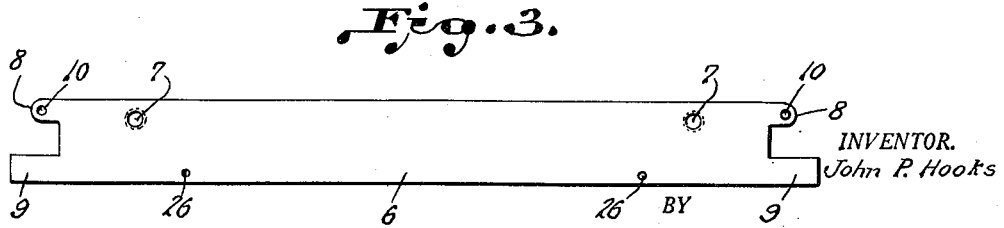
INVENTOR.
John P. Hooks
BY
Eugene E. Stevens
ATTORNEY.

Patented June 3, 1952

2,599,259

UNITED STATES PATENT OFFICE 2,599,259

LICENSE PLATE HOLDER

John P. Hooks, Chicago, Ill., assignor of fifteen per cent to John A. Holmes, Chicago, Ill.

Application July 17, 1950, Serial No. 174,155

4 Claims. (Cl. 40—125)

1

This invention relates to a license plate holder for holding the license plate of an automobile or other vehicle.

The main and primary object of the invention is to provide a license plate holder which can be easily attached to a portion of the vehicle, the license plate being held in the holder in such a manner that the license plate, together with its holder, can be freely swung to various positions to give access to that portion of the automobile covered by said plate whereby that portion of the automobile can be easily washed and cleaned.

A further object provides a holder of the type in which a license plate can be easily and quickly applied and removed from the holder.

A still further object of the invention provides upper and lower metal members having channels disposed toward each other, said channels engaging the opposite edges of a license plate and having coiled springs connecting the two channels together in a resilient manner so that the holder will fit various sizes of license plates.

A further object provides hingedly mounting the upper license plate bracket to the fixed part of the holder which allows for free pivotal movement of the license plate, such movement tensioning the holding springs which return the plate to its normal position upon release of the plate.

A further object embodies a license plate holder in which the respective parts can be die stamped for relatively low cost production.

Other objects and advantages will be apparent upon reference to the following description taken in connection with the accompanying drawings, in which—

Fig. 1 is a front vertical elevational view of the holder with the license plate removed;

Fig. 2 is an exploded view of the respective parts of the holder, showing the parts in perspective;

Fig. 3 is a vertical sectional view of the holder with the license plate in position; and Fig. 4 is a plan view of the upper bracket as it is stamped from a sheet of metal.

Referring to the drawings, in which like numerals are used to designate similar parts throughout the various views, the present license plate holder comprises and consists of an upper bracket 6 which may be formed from a strip of sheet metal as by a simple stamping operation, this bracket when so stamped embodying the form as illustrated in Fig. 3. The bracket 6 has inwardly of its upper edge two spaced apart drilled or tapped holes 7 for the reception of the usual standard size fastener bolts, the bolts being

2 adapted to pass through the holes 7 to engage some portion of a vehicle to thereby rigidly mount the bracket 6 in fixed position. The respective ends of the bracket are each provided with two extensions 8 and 9, the upper extension 8 being bent inwardly at right angles to the bracket 6 to form ears, said ears having drilled or punched therein holes 10, which holes are adapted to receive pivot pins of a pivoted front plate later to be described. The lower extension 9 is bent inwardly to form a lug which lies spaced from and parallel to the body of the plate 6.

An upper plate 11 has portions at its respective ends curled over as at 12 to form recesses for frictionally holding pivot pins 13 which may be driven into the recesses or openings as by a striking tool of any design. The upper portion of the plate 11 between the pivot pin-receiving end portions 12 is bent backwardly as at 14 in spaced and parallel relation with the front side of the plate 11 to form a U-shaped channel 15 which is adapted to receive the upper edge 16 of a usual license plate 17. The plate 11 is provided with longitudinal slots 18, whereby if and when desired the license plate can be locked to the pivotal plate as by bolt and nut fastenings extending through the usual license plate openings.

The lower bracket 19 has its lower edge 20 turned inwardly to lie in spaced and parallel relation with the body of the plate 19 to form an upwardly directed U-shaped channel 21, which channel is adapted to receive the lower edge portion 22 of the license plate 17. The lower plate 19 is urged into engagement with the lower edge of the license plate as by a pair of tension springs 23 having hooked ends 24 and 25, the hooked ends 24 engaging in the holes 26 drilled along the lower edge of the bracket 6 and the hooked ends 25 engaging in the drilled holes 27 spaced adjacent the upper edge of the lower bracket 19. The springs 23 are of such length that when mounted between the upper bracket 6 and the lower plate 19 they will exert sufficient tension to readily hold a license plate in position.

As heretofore pointed out, the license plate may be secured to the pivoted bracket 11 by means of usual license plate holder bolts 28 and nuts 29 as seen in Fig. 4.

In the assembly of the license plate holder it will readily be understood that, first of all, the upper bracket 6 is rigidly fixed to some part of the automobile body as by bolts extending through the openings 7. Thereafter, the pivoted plate 11 can be mounted in said bracket 6 as by positioning the plate within the ears 8 and driving the frictionally held pins through the holes 10 and into the openings formed by the curled portions 12 of the plate 11. In this position the plate 11 is pivotally mounted with respect to the bracket 6, the main body of the plate 11 at its inner surface lying flat against the outer surfaces of the lugs 9. The license plate can then be slipped, along its upper edge 16, into the U-shaped upper channel 15, and if desired, bolts such as 28 can be passed through the license plate and into the recesses 18 to lock the license plate to the pivoted plate 11. With the tension springs engaged in the holes 26 of the upper bracket, and with the holes 27 of the lower plate 19, it is only necessary to exert a sufficient spreading pull on the lower plate until the lower U-shaped channel 21 will snap over and engage the lower edge 22 of the license plate, whereupon the license plate is held within the holder.

As the main feature of the invention it will readily be understood that the license plate, when mounted, can be swung forwardly against the tension of the springs 23 in view of the fact that the upper plate 11 is pivotally mounted to the bracket 6; and in view of the fact that the license plate can be swung outwardly and upwardly, clear and easy access may be had to that portion of the automobile normally covered by the license plate to thereby provide for washing and cleaning that portion of the automobile. When the license plate is released from its pivoted or upward position, the tension of the springs 23 returns the same to its vertical normal position.

It is not intended that the invention be limited to the exact construction shown, but it is contemplated that the construction may be varied within the scope of the following claims.

I claim:

1. A license plate holder comprising in combination, an upper fixed bracket, a plate pivoted to said bracket and having a license plate edge-receiving channel supporting lugs carried by said upper bracket and constituting bearing stops against which said plate is supported, a lower plate having a license plate edge-receiving channel, and spring means engaging the upper bracket and the lower plate to urge the lower plate into license plate-engaging position.

2. A license plate holder comprising in combination, an upper fixed bracket, a plate pivoted to said bracket and having a downwardly opening channel for receiving the upper edge of the license plate, supporting lugs carried by said upper bracket and constituting bearing stops against which said plate is supported, a lower plate having an upwardly opening channel for receiving the lower edge of the license plate, and spring means between the fixed bracket and the lower plate to hold a license plate between the upper and lower channels.

3. A license plate holder comprising in combination, an upper fixed bracket having ears at its respective ends and spaced plate-supporting lugs, an upper plate having a portion thereof bent to form a channeled recess, pivot pins at the respective ends of the plate and fitting within the ears of the bracket, a lower plate having the lower edge portion thereof bent to form a channeled recess, a license plate mounted along its top and bottom edges within said recesses, and spring means between the fixed bracket and the lower plate urging the recesses into license plate engaging position.

4. A license plate holder comprising in combination, an upper bracket, the opposite edges having inturned ears with openings therein, plate supporting lugs turned in at the respective ends of the bracket and spaced from and parallel to the body of the bracket, an upper plate having pivot pins at its sides which fit within the openings in the bracket ears, the plate having its upper edge bent outwardly and downwardly to form a U-shaped upper recess, longitudinal slots in the upper plate body, a lower plate having its lower edge bent inwardly and upwardly to form a U-shaped lower recess, said recesses adapted to receive the upper and lower edges of a license plate, and coiled springs fastened between the upper bracket and the lower plate to urge the recesses together to hold the license plate.

JOHN P. HOOKS.

REFERENCES CITED

The following references are of record in the file of this patent:

UNITED STATES PATENTS

| Number | Name | Date |
| --- | --- | --- |
| 1,582,289 | MacPhail | Apr. 27, 1926 |
| 1,847,605 | Fitzgerald | Mar. 1, 1932 |
| 2,350,993 | Aigner | June 13, 1944 |